US005724222A

United States Patent [19]

Hirano et al.

[11] Patent Number: 5,724,222
[45] Date of Patent: Mar. 3, 1998

[54] BIAXIALLY ORIENTED POLYPROPYLENE FILM AND A CAPACITOR MADE THEREOF

[75] Inventors: Takumi Hirano, Shizuoka; Itsuo Nagai, Shiga; Shigeru Tanaka, Shiga; Masayoshi Asakura, Shiga, all of Japan

[73] Assignee: Toray Industries Inc., Tokyo, Japan

[21] Appl. No.: 703,328

[22] Filed: Aug. 27, 1996

[30] Foreign Application Priority Data

Nov. 29, 1995 [JP] Japan ................................ 7-310944

[51] Int. Cl.$^6$ .......................................................... H01G 4/26
[52] U.S. Cl. ........................... 361/311; 361/314; 361/315; 361/318; 252/567; 264/290.2
[58] Field of Search ................................ 361/311, 318, 361/301.5, 306.3, 312, 313, 314, 315, 326, 327, 319, 323, 512, 524, 530; 428/346, 336, 349, 461, 462, 512, 510, 323, 500; 525/106; 252/62, 567; 264/290.2; 174/8

[56] References Cited

U.S. PATENT DOCUMENTS

| 3,620,825 | 11/1971 | Lohmann | 428/336 |
| 3,715,639 | 2/1973 | Gaines et al. | 361/318 |
| 4,405,775 | 9/1983 | Hashimoto | 526/351 |
| 4,631,632 | 12/1986 | Kano et al. | 361/315 |
| 4,769,418 | 9/1988 | Mizuno et al. | 428/500 |
| 5,277,970 | 1/1994 | Schuhmann et al. | 428/323 |
| 5,292,563 | 3/1994 | Peiffer et al. | 428/35.9 |

*Primary Examiner*—Leo P. Picard
*Assistant Examiner*—Anthony Dinkins
*Attorney, Agent, or Firm*—Foley & Lardner

[57] ABSTRACT

The present invention relates to a biaxially oriented polypropylene film and a capacitor made thereof. The biaxially oriented polypropylene film of the invention is a biaxially oriented polypropylene film that is 98–99.5% in isotacticity, above 99% in isotactic pentad fraction, and 1–4% in the sum of the machine- and transverse-direction heat shrinkage at 120° C., or a biaxially oriented polypropylene film that is less than 10 ppm-% in the product of the film's ash content and internal haze and is above 99% in isotactic pentad fraction. With this constitution, the biaxially oriented polypropylene film of the present invention has good dielectric properties at high temperatures. Furthermore, the capacitor of the invention can be used safely for a long life at operating temperatures higher by up to 20° C. than the maximum operating temperature of 85° C. of the conventional biaxially oriented polypropylene films.

12 Claims, No Drawings

BIAXIALLY ORIENTED POLYPROPYLENE FILM AND A CAPACITOR MADE THEREOF

TECHNICAL FIELD

The present invention relates to a biaxially oriented polypropylene film, particularly to a biaxially oriented polypropylene film with high heat resistance and good dielectric properties, and also relates to a capacitor with high heat resistance and good dielectric properties wherein said polypropylene film is used as dielectric.

BACKGROUND TECHNOLOGY

Biaxially oriented polypropylene films are widely used in the fields of packaging and capacitor production because of their moisture barrier properties and good electrical properties as well as their good optical properties such as clarity and gloss.

Biaxially oriented polypropylene films are one of the major materials used as dielectric for film capacitor, but their use in a capacitor has been limited to temperatures up to about 85° C. as they are low in heat resistance as compared to polyester films, another major material. This is because their dielectric strength, which is an inherent advantage of polypropylene films, drastically deteriorates at high operating temperatures due to influences of amorphous domains and impurities, particularly making them unable to withstand long-term use in some cases.

As electrical equipment is generally decreasing in size, devices have been assembled densely and elevating maximum operating temperature, leading to stronger demand for conventional-type polypropylene film capacitors with an elevated operating temperature. This necessitates the development of a polypropylene film capacitor that is higher in maximum operating temperature than conventional ones and can maintain high performance for a longer period of time.

What have been called for to this end are: (1) a moderately small mechanical distortion, i.e. heat shrinkage, caused when heated rapidly in a short period of time, (2) good electrical properties at high temperatures, and (3) a small deterioration with time in said properties at high temperatures. Concerning the first objective, a polypropylene film during the capacitor device production process is generally wound with an electrode and then annealed at a specific temperature to cause a proper degree of heat shrinkage so that the winding of the layers is tightened to maintain its shape firmly and to squeeze out the air between layers. However, a excessively large heat shrinkage may deform the device to decrease the capacitance of the capacitor or to break the device. An insufficient shrinkage, on the other hand, may fail to achieve required tightening, possibly leading to destruction of the device, during long-term use, due to an increase in dielectric loss.

To solve these problems, Japanese Patent Laid-Open (Kokai) HEI 6-236709 has disclosed a polymer insulation material that shows good film forming characteristics and good dielectric properties from room temperature to 80° C., owing to a low ash content and 1–10 wt. % fraction soluble in boiling n-heptane. It is suggested that the isotactic pentad fraction in the portion insoluble in boiling n-heptane should be 90% or more.

Japanese Patent Laid-Open (Kokai) HEI 7-25946 has disclosed a propylene polymer that is 80 wt. % or more, preferably 96 wt. % or more, in fraction insoluble in boiling n-heptane, and 0.970–0.955 in the isotactic pentad fraction in the portion insoluble in boiling n-heptane, and moldings thereof.

However, biaxially oriented polypropylene films with an increased isotactic pentad fraction in the portion insoluble in boiling n-heptane as disclosed above are not sufficiently good in dielectric properties at high temperatures above 85° C., and capacitor devices consisting of such films used as dielectric cannot achieve a sufficiently high long-term heat resistance. Thus, high-stereoregularity biaxially oriented polypropylene films produced by said conventional techniques are sufficiently high in the isotactic pentad fraction in the portion insoluble in boiling n-heptane, but is low in the isotactic pentad fraction in the portion soluble in boiling n-heptane and as a result, the isotactic pentad fraction in the entire film is low, leading to an insufficiently small stereoregularity. In addition, so-called high-crystallinity biaxially oriented polypropylene films with an extremely high isotacticity are extremely poor in film forming characteristics due to an insufficient stereoregularity and have not successfully provided an established technique that is industrially useful in producing biaxially oriented polypropylene films with both a high heat resistance and dielectric properties.

As techniques to overcome these defects, Japanese Patent Publication (Koho) HEI 4-28727 has disclosed a crystalline polypropylene film that is 0.960–0.990 in isotactic pentad fraction and 3.0–6.0% in the total content of substances that are extracted by sequential extraction with boiling n-hexane and boiling n-heptane, leading good film-forming characteristics. However, said film is not sufficiently high in the isotactic pentad fraction and is not sufficiently good in the dielectric properties at high temperatures.

Furthermore, Japanese Patent Laid-Open (Kokai) HEI 5-217799 has disclosed a metallized film capacitor formed from a high-modulus metallized film that is produced by depositing metal over a high-modulus polypropylene film with a specific heat distortion temperature and Young's modulus along with a high stereoregularity. However, said film is only up to about 90% in stereoregularity and is not sufficiently good in dielectric properties at high temperatures.

Moreover, Japanese Patent Laid-Open (Kokai) HEI 7-50224 has disclosed a metallized polypropylene film that is 4.0% or less and 0.8% or less in the machine- and transverse-direction heat shrinkage, respectively, at 120° C. However, said film is not particularly high in isotacticity and stereoregularity as compared to conventional products, and good dielectric properties at high temperatures, which is the objective of the present invention, are not sufficiently good to meet advanced needs in the future.

SUMMARY OF THE INVENTION

The objective of the invention is to provide a biaxially oriented polypropylene film with high heat resistance and good long-term dielectric properties at high temperatures, and to provide a capacitor with high heat resistance and good long-term dielectric properties at high temperatures that is produced by using said biaxially oriented polypropylene film as dielectric. To meet this objective, the inventors of the present invention performed highly precise control of the isotacticity and stereoregularity of a polypropylene film to produce a polypropylene film with an extremely high isotacticity, and adopted proper film-forming conditions so that an optimum heat shrinkage of the biaxially oriented polypropylene film is achieved to improve its dielectric properties, a major advantage of polypropylene film, up to a level that cannot be attained by the conventional techniques, resulting in the development of a capacitor in which the deterioration in said properties at high temperatures and long-term degradation at high temperatures are restrained.

Thus, the present invention relates to a biaxially oriented polypropylene film that is 98–99.5% in isotacticity, above 99% in isotactic pentad fraction, and 1–4% in the sum of the machine- and transverse-direction heat shrinkage at 120° C., and relates to a capacitor produced by using said film as dielectric.

The invention also relates to a biaxially oriented polypropylene film that is above 99% in isotactic pentad fraction and has properties as shown by the following formula, and relates to a capacitor produced by using said film as dielectric.

Ash·H≦10 (ppm·%)

where Ash and H denote the ash content and the internal haze of the film, respectively.

DETAILED DESCRIPTION OF THE PREFERRED EMBODIMENTS

The biaxially oriented polypropylene film of the present invention is a biaxially oriented polypropylene film consisting mainly of polypropylene, but may contain copolymerized elements consisting of other unsaturated carbon hydrides as long as they do not hinder the fulfillment of the invention. Such copolymerized elements include ethylene, 1-butene, 1-pentene, 3-methylpentene-1, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, and 5-methylnorbornene. The copolymerization rate should be less than 1% considering the dielectric properties and heat resistance.

A biaxially oriented polypropylene film used for the invention should be 99.5% or less in isotacticity considering its film-forming characteristics. The isotacticity is defined in terms of the weight of the insoluble portion of the film after extraction in boiling n-heptane relative to the total weight of the film prior to the extraction. If the isotacticity is excessively high, the stretchability will be low and it will be very difficult to produce a good biaxially oriented polypropylene film, as described in Japanese Patent Laid-Open (Kokai) HEI 6-236709. To achieve good film-forming characteristics, high heat resistance and good dielectric properties, the isotacticity should preferably be in the range of 98.5–99.5%, more preferably 98.7–99.3%. To produce a biaxially oriented polypropylene film with such an isotacticity, a polypropylene resin that is properly low in the content of low-molecular-weight components soluble in boiling n-heptane and in the content of low-stereoregularity, or atactic, components may be used as raw material.

For the present invention, the stereoregularity of a biaxially oriented polypropylene film can be evaluated in terms of the pentad fraction determined from the methyl absorption peak measured by $^{13}$C-NMR. In general, the conformations of the five repeating units (pentad) in a polypropylene molecular chain include mmmm, mmmr, rmmr, . . . , rrrr, mrrr, mrrm, where m and r denote the meso and rasemo conformation, respectively. To obtain the pentad fraction of a biaxially oriented polypropylene film, the proportion of the segments in each of the above conformations can be determined from $^{13}$C-NMR, as reported, for example, by T. Hayashi [Polymer, 29, 138–143 (1988)]. Of these, the proportion of the mmmm conformation relative to the total absorption intensity of the methyl group, i.e. the isotactic pentad fraction (which may be referred to as mmmm fraction hereinafter), is defined as the sum of three heptad fractions for m(mmmm)m, m(mmmm)r, and r(mmmm)r.

The isotactic pentad fraction (mmmm fraction) of a biaxially oriented polypropylene film used for the invention is above 99%. Such film is formed of polypropylene that consists of molecules with extremely long isotactic segments, and therefore, can provide a film with a high crystallinity, high heat resistance, and good dielectric properties. To achieve a high heat resistance and good dielectric properties, the mmmm fraction of a biaxially oriented polypropylene film used for the invention should be 99.1% or more, preferably 99.2% or more, and more preferably 99.3% or more. An effective approach to achieving such a conformation is to precisely control the conformation in the polypropylene resin that is used for raw material. To obtain such material, a high-purity catalyst (solid catalyst, external electron donor compound) is used in polymerizing polypropylene. It has been found that a polypropylene resin material with a higher mmmm fraction can produce a biaxially oriented polypropylene film with a higher mmmm fraction, but an excessive heat degradation of the raw material in the extrusion system can decrease the mmmm fraction. A proper structure and extrusion conditions are selected to prevent the material from stagnating in the high-temperature extrusion system for a long period of time.

For the present invention, the heat resistance of a biaxially oriented polypropylene film can be evaluated in terms of the heat shrinkage that occurs when heated at 120° C. for 15 min. A biaxially oriented polypropylene film used for the invention should be in the range of 1–4% in the sum of the machine- and transverse-direction heat shrinkage that occurs when heated at 120° C. for 15 min. If the heat shrinkage is too large, the film may undergo dimensional changes in forming a metallized layer as an electrode, leading to wrinkles in film rolls, or an excessively large mechanical distortion may be caused by heat during capacitor device production to generate a stress in the film and/or the contact portion with the external electrode leading to a large decrease in the capacitance or destruction of the device. If the heat shrinkage is too small, the tightening of the winding achieved by the heat treatment during capacitor device production may be insufficient and may have adverse effect on the Shape retainability and capacitance change. The desirable range of heat shrinkage is 1–3.5% in terms of the above-mentioned sum, preferably 1.5–3%, more preferably 1.5–2.8% especially 1.8–2.5%. The film-forming conditions are extremely important in adjusting the heat shrinkage in such ranges. Whereas conventional biaxially oriented polypropylene films with ordinary isotacticity and mmmm fraction are generally manufactured by casting at a casting drum temperature of 85° C. or more, as described in Japanese Patent Laid-Open (Kokai) HEI 7-50224, a biaxially oriented polypropylene film for the invention should preferably be cast at a lower casting drum temperature of 40°–85° C. If the casting drum temperature is too high, the film may crystallize up to an excessively high degree, leading to a difficulty in stretching in the subsequent process or to an excessively high heat shrinkage. For conventional biaxially oriented polypropylene films, a machine-direction stretching temperature of 140° C. or less and a transverse-direction stretching temperature of 160° C. or less are generally adopted, and if the stretching temperatures, exceed them, the orientation may deteriorate, making it difficult to maintain a modulus required for the biaxially oriented polypropylene film. For biaxially oriented polypropylene films for the present invention, a machine-direction stretching temperature of 140°–150° C. and a transverse-direction stretching temperature of 160°–165° C. are desired in order to obtain a required heat shrinkage while maintaining a modulus required for the biaxially oriented polypropylene films. The heat shrinkage Will be too large if the two stretching temperatures are too low. The temperature for heat-set with relaxation in the transverse direction may be adjusted to 150°–160° C. The heat shrinkage will be too large if the heat-set temperature is too low, while the heat shrinkage will be too small if the temperature is too high.

The intrinsic viscosity of high-stereoregularity polypropylene to be used for biaxially oriented polypropylene film production for the present invention should preferably be in, but not limited to, the range of 1–10 dl/g considering the film-forming characteristics. The melt flow index under a load of 2.16 kg at 230° C. should preferably be in the range of 2–5 g per 10 min considering the film-forming characteristics. An approach to achieving such an intrinsic viscosity and a melt flow index as above is to control the average molecular weight and the molecular weight distribution.

Generally, a polypropylene polymerization process uses a metal-containing compound as catalyst, and its residue is removed, if necessary, after the polymerization. Such residual catalyst can be evaluated based on the amount of the metal oxide that remains after the complete combustion of the resin, which is called ash content. The ash content of a biaxially oriented polypropylene film used for the invention should be 30 ppm or less, preferably 25 ppm or less, more preferably 20 ppm or less. If the ash content is excessively large, the film can deteriorates in dielectric properties, and the capacitor made of the film will be low in dielectric strength. For the ash content to be within this range, it is important to use a material with little residual catalyst, but another effective approach is to minimize the contamination from the extrusion system during the film-forming process by, for example, carrying out the cleaning of the extrusion system by bleeding polymer for one hour or longer.

Another item of the present invention is a biaxially oriented polypropylene film for capacitor that is above 99% in isotactic pentad fraction and 10 ppm·% or less in the product of the above-mentioned ash content of the film (ppm) and the internal haze (%). The product of the ash content of the film and the internal haze, should preferably be 8 ppm·% or less, more preferably 5 ppm·% or less. For the above-mentioned reason, it is important for the ash content of the film to be small in order to achieve good dielectric properties. Depending on the properties of the raw material and/or the film-forming conditions, voids, which are reflected in the internal haze, may be generated, having adverse effect on the dielectric properties. Thus, good dielectric properties can be achieved by adjusting the product of the ash content and the internal haze to a specific range. To achieve such a range, it is important to use a polypropylene material with a small ash content, but a high-stereoregularity biaxially oriented polypropylene film as used for the present invention is likely to crystallize readily at the high casting drum temperature, and the stretching of such cast film at a sow temperature can cause a high internal haze. Effective approaches to controlling the internal haze at a low level include maintaining the casting drum temperature at 85° C. or less, maintaining the longitudinal stretching temperature at above 140° C., and maintaining the lateral stretching temperature at above 160° C., which may be performed alone or in combination.

A biaxially oriented polypropylene film used for the invention can have an optimum balance between the heat resistance and dielectric properties when the film is 30 ppm or less in ash content, 10 ppm·% or less in the product of the ash content and the internal haze, and 72–78% in the crystallinity determined from the density of the film. The degree of crystallinity should preferably be 73–77%, more preferably 74–76%. If the crystallinity is too low, the heat resistance and/or the dielectric properties may deteriorate, while the crystallinity is too high, voids may be generated to reduce the dielectric properties. The most important approach to achieving the above ranges is to adjust the casting drum temperature to an optimum value during the film-forming process. The crystallinity will be too low if the temperature is too low, i.e. less than 40° C., while The crystallinity will be too high if the temperature is too high, i.e. above 85° C.

For the present invention, there are no specific limitations on the thickness of the biaxially oriented polypropylene film, but it is desirable for the thickness to be in the range of 0.5–40 μm considering the film-forming properties and mechanical properties. For a metallized film capacitor, the thickness should preferably be in the range of 1–12 μm in order to avoid damage by heat during the metallization process and to achieve good dielectric properties.

For the present invention, the dielectric properties of the biaxially oriented polypropylene film can be evaluated based on the dielectric strength under DC applied voltage at 105° C. In general, the dielectric strength per unit thickness (V/μm) of a biaxially oriented polypropylene film decreases with decreasing film thickness. The dielectric strength at 105° C. of a biaxially oriented polypropylene film used for the present invention should preferably be $580-(200/d^{0.5})$ (V/μm) or more, more preferably $600-(200/d^{0.5})$ (V/μm) or more, where d denotes the film thickness. If the dielectric strength at 105° C. is too low, dielectric breakdown becomes very likely to occur at high temperatures, making the film unsuitable for use in a capacitor. Effective approaches to achieving the above-mentioned ranges include further decreasing the ash content and internal haze of the film and maximizing the crystallinity within the ranges required for the invention.

For a biaxially oriented polypropylene film used for the invention, an optimum surface roughness may be chosen as required for specific objectives, but when it is to be used in a metallized film capacitor, the average center line surface roughness should preferably be in the range of 0.02–0.2 μm. If average center line surface roughness is too large, air is likely to remain between stacked layers, leading to degradation of the capacitor device, while it is too small, the film will be poor in slip properties and, in turn, handling properties. For oil impregnation uses, the average center line surface roughness should preferably be in the range of 0.1–0.8 μm. To achieve such a range, it is particularly important to adjust the casting drum temperature to an optimum value. The effective range of the casting drum temperature is 40°–85° C. The surface roughness will become too large if the casting drum temperature is too high, while the surface roughness will become too small if the temperature is too low. To achieve an optimum surface roughness for oil impregnation uses, for example, at least one of the surfaces of the polypropylene film used for the invention can be provided with a 0.5–1.5 μm thick layer of ethylene-propylene copolymer to form a laminate.

A biaxially oriented polypropylene film to be used for the invention may contain known additives including nucleating agent, antioxidant, thermostabilizer, slip agent, antistatic agent, anti-blocking agent, filler, viscosity improver, and anti-coloring agent.

Of these, the selection of a proper antioxidant and its amount is important to achieve long-term heat resistance. Antioxidants to be added to a biaxially oriented polypropylene film for the present invention should preferably be phenolic ones with large steric hindrance, at least one of which should be a high molecular weight one with a molecular weight of 500 or more to minimize the volatile loss during melt extrusion. Many examples can be cited, but typical ones include 2,6-di-tibutyl-p-cresol (BHT: molecular weight 220.4), 1,3,5-trimethyl-2,4,6-tris(3,5-di-t-butyl-4-hydroxybenzyl)benzene (e.g., Chibageigy Co., Ltd. Irganox 1330, molecular weight 775.2), and tetrakis[methylene-3(3, 5-di-t-butyl-4-hydroxyphenyl)propionate]methane (e.g., Chibageigy Co., Ltd. Irganox 1010, molecular weight 1177.7), which should preferably be used in combination. The total content of these antioxidants should preferably be 0.03–1 wt. % (300–10000 ppm) of the total weight of polypropylene. The long-term heat resistance may become low if it is less than 0.03 wt. %, while if it is above 1.0 wt. %, blocking at high temperatures caused by bleedout of these antioxidants can have adverse effect on the capacitor device. The content should more preferably be 0.1–0.9 wt. %, further more preferably 0.2–0.8 wt. %.

For a biaxially oriented polypropylene film used for the invention, corona treatment or plasma treatment should be performed over the surface on which a metal layer is to be deposited, in order to achieve a high adhesive strength. Known methods can be used for the corona treatment, but the desirable atmospheric gases in which the treatment is performed include air, carbon dioxide, nitrogen gas, and their mixtures. Various gases can be used for the plasma treatment. A typical approach is to produce their plasma, which is then used to cause chemical changes in the film surface. The method described in Japanese Patent Laid-Open (Kokai) SHO 59-98140, for example, can be adopted.

A biaxially oriented polypropylene film to be used as dielectric in a capacitor of the present invention may be wound along with metal foil used as electrode, or may be metallized to form electrode before winding, but to obtain a small-size capacitor device, it should preferably be metallized prior winding.

There are no specific limitations on the metal to be used for producing a metal layer over the biaxially oriented polypropylene film for the invention, but desirable ones to obtain a durable metallized layer and to achieve a high productivity include aluminum, zinc, tin, copper, silver, and nickel, which may be used alone or in combination.

There are no specific limitations on the method to form a metal layer over the biaxially oriented polypropylene film of the invention, but effective methods include vacuum deposition, sputtering, and ion plating.

For the present invention, the surface resistivity of the metallized film should preferably be in the range of 1–40 Ω/square, more preferably 1.2–30 Ω/square. If the surface resistivity is too small, the thickness of the deposit will be too large and damage is caused by heat during metallization, possibly producing crater-like surface defects or leading to perforations in the case of a thin film of about 4 μm. If the surface resistivity is too large, loss of the deposit is likely to occur when clearing of the deposit takes place at the time of the application of voltage, leading to large changes in capacitance. Desirable methods for adjusting the surface resistivity to these ranges include controlling the surface resistivity while monitoring it during metallization.

There are no specific limitations on the specifications of the margin (a metal-free portion that is provided on the metallized surface for electrical insulation purposes, etc.) that is provided when a metal layer is formed over the biaxially oriented polypropylene film of the invention. Ordinary-type margins or others such as one with a fuse mechanism may be adopted as required.

There are no specific limitations on the type of the capacitor of the present invention, which may be, for example, of a dry type or oil impregnation type.

A film capacitor produced by using as dielectric the biaxially oriented polypropylene film of the present invention should preferably be 200 V/μm or more in dielectric strength under AC applied voltage per unit thickness at 105° C. For, the rated voltage for polypropylene film capacitors is generally 45–50 V/μm, and considering the safety, the dielectric strength should be four times the value or more. It should more preferably be 210 V/μm or more. To maintain the dielectric strength of a film capacitor in this range, the formation of wrinkles and scratches should be avoided at the processing step in the capacitor production process.

A film capacitor that is produced by using as dielectric the biaxially oriented polypropylene film of the present invention should preferably be 500 hours or more, more preferably 1000 hours or more, in operating life under AC applied voltage per unit thickness of 60 V/μm (1.2–1.3 times the rated voltage) at 105° C., taking into consideration the guarantee period of equipment that installs the capacitor. Effective approaches to achieving an operating life in these ranges include adding a proper amount of antioxidants, performing heat treatment at about 100° C. at the processing step in the capacitor production process, avoiding the formation of wrinkles and scratches, and keeping the capacitor out of contact with external air by sealing the metal container (outer package) containing the capacitor which is molded in epoxy resin or impregnated with resin or oil.

Methods for producing a biaxially oriented polypropylene film of the present invention and methods for producing a capacitor made thereof are described below, though other methods may also be effective.

Raw polypropylene material is fed to the extrusion system, melted by heating, filtered through a filter assembly, extruded through a slit die at a temperature of 220°–320° C., wound on a casting drum kept at a temperature of 40°–85° C., and solidified by cooling to produce cast film.

Then, this cast film is subjected to biaxial stretching to be biaxially oriented. The stretching should preferably be performed by sequential biaxial stretching. For sequential biaxial stretching, the cast film is pre-heated on rolls kept at 120°–150° C., then passed on rolls with different peripheral speeds kept at a temperature of 140°–150° C. for 2–6 times stretching in the machine direction, followed by immediate cooling to room temperature. It is important here to adopt a stretching temperature of higher than 140° C., because if the pre-heating temperature is less than 130° C. or if the stretching temperature is less than 140° C., a biaxially oriented polypropylene film with a mmmm fraction of above 99% as used for the invention may suffer variations in stretching ratio or may break to hinder the film-forming process due to shortage of heat. The stretched film is then fed to a tenter oven, stretched at 160°–165° C. to 5–10 times in the transverse direction, and, while being relaxed by 2–20% in the transverse direction, followed by heat-set at a temperature of 150°–160° C. and winding. This heat-set temperature is important for the invention, and if the heat-set temperature is too low, the heat shrinkage may increase out the range required for the invention.

After this, the surface to be metallized is subjected to corona treatment in air, nitrogen, carbon dioxide, or a mixture of them to increase the adhesive strength of the deposited metal, followed by winding with a winder.

The resultant film is placed in a vacuum deposition chamber, and a proper metal for the specific objective is deposited to achieve a required surface resistivity. The metallized film is then slit to produce a pair of metallized film reels to be used for capacitor device production. It is then wound into a device-like shape, and heat-pressed into a flat shape. Metal is then sprayed to the end portion, and leads are soldered, followed by packaging to provide capacitors.

In addition to such capacitor production as describe above, the biaxially oriented polypropylene film of the present invention can be used for various packaging applications because it is so low in heat shrinkage that it will not undergo large size changes when subjected to heat during such processes as deposition, printing, laminating, and heat-sealing. For example, the film may be combined with a heat-seal layer to produce a laminate, or may also be useful as material for adhesive tape and glossy film (print laminate).

The methods used for measuring and evaluating the characteristic values for the invention are described below.

(1) Isotacticity (isotactic index: II)

A specimen is subjected to extraction in n-heptane at a temperature of 60° C. or less for 2 hours to remove additives from the polypropylene material, followed by vacuum drying at 130° C. for 2 hours. A specimen with a weight W (mg) is taken from the resultant material, and subjected to extraction in boiling n-heptane in a Soxhlet extractor for 12 hours. The specimen is then taken out, washed adequately in acetone, subjected to vacuum drying at 130° C. for 6 hours, and cooled to room temperature. Its weight, W' (mg), is measured, and the isotacticity is calculated by the following formula.

$$II=(W'/W)\times 100(\%)$$

(2) Isotactic pentad fraction

A specimen is dissolved in o-dichlorobenzene, and $^{13}$C-NMR is measured at a resonance frequency of 67.93 MHz using JEOL Ltd. JNM-GX270 spectrometer. The method proposed by T. Hayashi et al. [Polymer, 29, 138–143 (1988)] is used for the calculation to determine the assignment of spectral peaks and the pentad fraction. Assigning the 21.855 ppm peak to the mmmmmm peak for the spectrum from the methyl group, each peak is assigned and its peak area is calculated to determine its percentage proportion relative to the total area of the peaks attributed to the methyl group. Detailed measuring conditions are as follows.

Solvent used for measurement: o-dichlorobenzene (90 wt. %)/benzene-D6 (10 wt. %)

Measuring temperature: 120°–130° C.

Resonance frequency: 67.93 MHz

Pulse width: 10 µsec (45° pulse angle)

Pulse repetition time: 7.091 sec

Data points: 32K

Number of accumulations: 8168

Measurement mode: noise decoupling (3) Heat shrinkage

A sample of film measuring 260 mm and 10 mm in the machine direction and the transverse direction, respectively, is taken out, and a mark is made at 30 mm from each edge to set up the original size (L0:200 mm). A weight of 3 g is applied to the bottom end of the sample, and hung in an oven of 120° C., and subjected to heat treatment for 15 min. The sample is then removed and the distance between the marks (L1) is measured. The following formula is used to calculate the heat shrinkage, which is defined as the sum of the calculations in the machine direction and transverse direction.

$$\text{Heat shrinkage}=[(L0-L1)/L0]\times 100(\%)$$

(4) Ash content

Measurement is performed according to JIS C-2330. A specimen of biaxially oriented polypropylene film, with an initial weight of W0, is put in a platinum crucible, combusted completely over a gas burner, and then heated in an electric furnace at 750°–800° C. for about 1 hour to ensure complete ashing, followed by measurement of the weight of the resultant ash, $W_1$, and calculation of the ash content by the following formula.

$$\text{Ash content}=(W_1/W_0)\times 1000000 \text{ (ppm)},$$

where $W_0$ is the initial weight (g) and $W_1$ is the ash weight.

(5) Internal haze

Measurement is carried out according to JIS K-7105, and calculations are made by the following formula. The measurement is performed with the specimen immersed in a quartz cell filled with liquid paraffin in order to remove the light scattering from the rough film surface.

$$H=(Td/Tt)\times 100(\%),$$

where H, Td, and Tt denote the internal haze (%), diffuse transmittance, and total transmittance, respectively.

(6) Crystallinity

According to the method D in JIS K-7112, the density of a specimen is measured in an ethanol-water density gradient tube at 23°±0.5° C., and the crystallinity is calculated by the following formula.

$$\text{Crystallinity}=[(dc/d)\times(d-da)/(dc-da)]\times 100(\%),$$

where d, dc, and da denote the density of the specimen, density of completely crystallized polypropylene (0.936 g/cm$^3$), and density of amorphous polypropylene (0.850 g/cm$^3$).

(7) Film thickness

The film thickness is measured with a dial gauge type thickness meter (JIS B-7503).

(8) Film dielectric strength

The measurement is carried out according to JIS C-2110. A 10 cm×10 cm piece of aluminum foil of 100 µm in thickness and a brass rod of 25 mm in diameter are used as cathode and anode, respectively. A film specimen is placed between them, and DC voltage is applied while increasing the voltage at a rate of 200 V/sec using a Kasuga Denki Co., Ltd. DC high-voltage stabilizing voltage supply. Dielectric breakdown is assumed to occur when a current of 10 mA is measured. The voltage at this point divided by the film thickness at the measuring point is defined as the dielectric strength. A total of 20 measurements are made and their average is used as the dielectric strength value for the calculation. Measurement at 105° C. is performed after setting the electrodes and the specimen in a hot air oven, connecting them to said voltage supply using a heat-resistant cable, and starting to increase the voltage 1 min after they are placed in the oven.

(9) Device dielectric strength

A capacitor device maintained at 105° C. in a hot air oven is connected to a Kasuga Denki Co., Ltd. AC high-voltage stabilizing voltage supply, and AC voltage is applied while increasing the voltage at a rate of 200 V/sec. The voltage at the time when the device is broken is measured, and measurements for 10 devices are averaged to provide the device dielectric strength.

(10) Device life test

An AC voltage per unit film thickness of 60 V/μm is applied to a capacitor device, and the time required for the breakdown of the device in an atmosphere of 105° C. is measured.

EXAMPLES

The present invention is described in detail below with reference to examples and comparative examples.

Example 1

Polypropylene material with an II of 98.8%, mmmm fraction of 99.5% and ash content of 19 ppm that contain 3000 ppm of 2,6-di-t-butyl-p-cresol (BHT) and 5000 ppm of tetrakis[methylene-3(3,5-di-t-butyl-4-hydroxyphenyl)propionate]methane (Irganox 1010) was fed to an extrusion system, melted at a temperature of 280° C., extruded from the T-shape slit die to form a sheet, and wound on a casting drum at a temperature of 70° C. for cooling and solidification. Subsequently, the film was pre-heated at 135° C., and then passed on rolls with different peripheral speeds kept at a temperature of 143° C. for stretching five times in the machine direction. The stretched film is then fed to a tenter oven, stretched at 162° C. to 10 times in the transverse direction, and, while being relaxed by 8% in the transverse direction, subjected to heat treatment at 158° C. to produce a biaxially oriented polypropylene film of 5 μm in thickness. Corona treatment was then carried out in the atmosphere at a treatment intensity of 30 W·min/m². The ash content and pentad fraction of the resultant film was not significantly different from those of the raw material. This film was placed in a vacuum deposition chamber, and while using copper as nucleating metal, zinc was deposited over the corona-treated surface to allow the surface resistivity to become 4.0 Ω/square. This film was slit to provide a metallized film sheet of 38 mm in total width and 1 mm in margin. Device winding was performed using a pair of reels. Metal was then sprayed to the end portion of the device, and leads were soldered on this portion to provide a capacitor device with a capacitance of 5 μF.

Examples 2 and 3

Using a polypropylene material with an II of 98.9%, mmmm fraction of 99.1% and ash content of 18 ppm or a propylene material with an II of 98.3%, mmmm fraction of 99.1% and ash content of 19 ppm, a biaxially oriented polypropylene film and a capacitor device were produced by the same procedure as in Example 1.

Example 4

Using a polypropylene material with an II of 98.8%, mmmm fraction of 99.1% and ash content of 31 ppm, a biaxially oriented polypropylene film and a capacitor device were produced by the same procedure as in Example 1.

Examples 5 and 6

Using the same material as in Example 1, a biaxially oriented polypropylene film of 2 μm and 8 μm in thickness in Examples 5 and 6, respectively, and a capacitor device were produced under the same conditions as in Example 1.

Example 7

Using a polypropylene material with an II of 99.3%, mmmm fraction of 99.6% and ash content of 15 ppm, a biaxially oriented polypropylene film and a capacitor device were produced by the same procedure as in Example 1.

The characteristics of these biaxially oriented polypropylene films and those of the capacitor devices are shown in Table 1. All of these films have a heat shrinkage within the range required for the present invention, and accordingly have a high dielectric strength, making it possible to produce a capacitor device that has a high dielectric strength and a sufficiently long operating life. The films obtained in Examples 4 and 5 had a practically sufficient operating life though their dielectric Strength was a little smaller than $580-(200/d^{0.5})$ because of the high ash content of 31 ppm in Example 4 and a small film thickness in Example 5.

Examples 8 and 9

Using the same material as in Example 1 that contains 200 ppm of 2,6-di-t-butyl-p-cresol (BHT) alone (Examples 8) or 3000 ppm of BHT and 8000 ppm of tetrakis[methylene-3 (3,5-di-t-butyl-4-hydroxyphenyl)propionate]methane (Irganox 1010) (Example 9), film-forming operations were carried out under the same conditions as in Example 1 to produce biaxially oriented polypropylene films and capacitor devices. The heat shrinkage and dielectric strength of the films and the dielectric strength of the Capacitor devices were at the same levels as in Example 1, though the operating life of the devices were 480 hours in Example 8 and 450 hours in Example 9, which are a little unsatisfactory.

Comparative examples 1 and 2

Using a polypropylene material with an II of 97.5%, mmmm fraction of 97.2% and ash content of 18 ppm or a polypropylene material with an II of 98.3%, mmmm fraction of 98% and ash content of 19 ppm, a biaxially oriented polypropylene film and a capacitor device were produced by a procedure that is the same as in Example 1 except that the casting drum temperature was 85° C. Their characteristics are shown in Table 1. In both Comparative examples, the heat shrinkage was within the range required for the present invention, though their II values and mmmm fractions were out of the range required for the invention. Both films were insufficient in dielectric strength, and the capacitor devices were also insufficient in dielectric strength and operating life.

Comparative example 3

Using a polypropylene material with an II of 99.7%, mmmm fraction of 99.2% and ash content of 22 ppm, an attempt was made to carry out film-forming operations under the same conditions as in Example 1, but it failed because of breakage of films. So film-forming operations were performed at a casting drum temperature of 30° C., a longitudinal stretching temperature of 153° C., and a lateral stretching temperature of 167° C. A capacitor device was produced by the same procedure as in Example 1. Their characteristics are shown in Table 1. The II value of the film exceeds the upper limit for the invention. Its heat shrinkage is within the range required for the invention, but its crystallinity is a high 79% and its internal haze is also a high 0.6%, causing the product of the ash content and the internal haze to be 13.2 ppm·%. As a result, the film was insufficient in dielectric strength, and the capacitor device was also insufficient in dielectric strength and operating life.

Comparative example 4

Using the same polypropylene material as in Comparative example 3, film-forming operations were carried out under conditions that are the same as in Comparative example 3 except that the casting drum temperature was 50° C., and a biaxially oriented polypropylene film and a capacitor device were obtained. The film was 4.5% in heat shrinkage and high 0.7% in internal haze, causing the product of the ash content and the internal haze to be high 15.4 ppm·%. As a result, the film was insufficient in dielectric strength, and the capacitor device was also insufficient in dielectric strength and operating life.

Comparative example 5

Using the same polypropylene material as in Example 1, film-forming operations were carried out under conditions that are the same as in Example 1 except that the casting drum temperature was 95° C., and a biaxially oriented polypropylene film and a capacitor device were obtained. The film was high 4.2% in heat shrinkage and high 0.8% in internal haze, causing the product of the ash content and the internal haze to be 15.2 ppm·%. As a result, the film was insufficient in dielectric strength, and the capacitor device was also insufficient in dielectric strength and operating life.

Comparative example 6

Using a polypropylene material with an II of 98.1%, ash content of 15 ppm, titanium content of 0.3 ppm, and chlorine content of 0.4 ppm, the same procedure as in Example 1 was carried out to produce a biaxially oriented polypropylene film and a capacitor device. The film show high dielectric strength values of 605 V/μm and 520 V/μm at 23° C. and 80° C., respectively, but the dielectric strength rapidly decreases to 380 V/μm at 105° C., leading to an insufficient dielectric strength and operating life of the capacitor device. The n-heptane-insoluble component of the film was shown by measurement to have a very high mmmm fraction of 99.3%, while the mmmm fraction of the film was 98.3%.

Comparative example 7

Using a polypropylene material with an II of 96.8%, ash content of 20 ppm, and melt flow index of 32 g per 10 min at 230° C. under a load of 2.16 kg, the same procedure as in Example 1 was carried out to produce a biaxially oriented polypropylene film and a capacitor device. The dielectric strength and operating life of the capacitor device, as well as the dielectric strength of the film, were insufficient. The n-heptane-insoluble component of the film was shown by measurement to be 99.3% in mmmm fraction and 77% in crystallinity, while the mmmm fraction and crystallinity of the film were 95.5% and 70%, respectively.

Comparative examples 8 and 9

Using the same material as in Example 1, film-forming operations were carried out under conditions that, were same as in Example 1 except that the heat treatment temperature was 145° C. (Comparative examples 8) or 167° C. (Comparative examples 9), and biaxially oriented polypropylene films and capacitor devices were obtained. They were 4.6% and 0.9%, respectively, in heat shrinkage, and their dielectric strength values were at the same level as those in Example 1. But the capacitor devices were 148 V/μm and 161 V/μm in dielectric strength and 46 hours and 17 hours in operating life, all of which were insufficient.

TABLE 1

| | II (%) | mmmm (%) | Ash content (ppm) | Thickness (μm) | Heat shrinkage (%) | Internal haze (%) | Ash × H (ppm · %) | Crystallinity (%) | Dielectric strength capacitor (V/μm) DC105° C. | Dielectric strength of capacitor (V/μm) AC105° C. | Life of capacitor (hours) 105° C. |
|---|---|---|---|---|---|---|---|---|---|---|---|
| Example 1 | 98.8 | 99.5 | 19 | 5 | 2.1 | 0.2 | 3.8 | 75 | 530 | 218 | >1000 |
| Example 2 | 98.9 | 99.1 | 18 | 5 | 3.1 | 0.2 | 3.6 | 74 | 520 | 207 | >1000 |
| Example 3 | 98.3 | 99.1 | 19 | 5 | 3.6 | 0.1 | 1.9 | 74 | 505 | 203 | >1000 |
| Example 4 | 98.8 | 99.1 | 31 | 5 | 2.9 | 0.3 | 9.3 | 74 | 440 | 185 | >1000 |
| Example 5 | 98.8 | 99.5 | 19 | 2 | 2.2 | 0.1 | 1.9 | 73 | 420 | 170 | >1000 |
| Example 6 | 98.8 | 99.5 | 19 | 8 | 2.1 | 0.1 | 1.9 | 75 | 540 | 232 | >1000 |
| Example 7 | 99.3 | 99.6 | 15 | 5 | 1.9 | 0.3 | 4.5 | 76 | 515 | 207 | >1000 |
| Comparative example 1 | 97.5 | 97.2 | 18 | 5 | 4.3 | 0.1 | 1.8 | 71 | 410 | 160 | 118 |
| Comparative example 2 | 98.3 | 98 | 19 | 5 | 4.2 | 0.1 | 1.9 | 73 | 430 | 172 | 139 |
| Comparative example 3 | 99.7 | 99.2 | 22 | 5 | 2.3 | 0.6 | 13.2 | 79 | 310 | 135 | 320 |
| Comparative example 4 | 99.7 | 99.2 | 22 | 5 | 4.5 | 0.7 | 15.4 | 80 | 280 | 122 | 21 |
| Comparative example 5 | 98.8 | 99.5 | 19 | 5 | 4.2 | 0.8 | 15.2 | 79 | 380 | 185 | 27 |
| Comparative example 6 | 98.1 | 98.3 | 15 | 5 | 2.9 | 0.1 | 1.5 | 71 | 380 | 180 | 25 |
| Comparative example 7 | 96.8 | 95.5 | 20 | 5 | 5.5 | 0.1 | 2 | 70 | 375 | 170 | 8 |

Industrial applicability

The biaxially oriented polypropylene film of the present invention is high in heat resistance and long-term dielectric properties at high temperatures, and as a result, a capacitor produced by using this biaxially oriented polypropylene film as dielectric can have a maximum operating temperature 20° C. higher by up to 20° C. than the maximum operating temperature of 85° C. of the capacitors formed of the conventional biaxially oriented polypropylene film. In addition, the film is very low in heat shrinkage, making it possible, when used for packaging applications, to restrain the distortion that may be caused by heat during the production process. Thus the film is extremely high in industrial applicability.

We claim:

1. A biaxially oriented polypropylene film that is 98–99.5% in isotacticity, above 99% in isotactic pentad fraction, and 1–4% in the sum of the machine- and transverse-direction heat shrinkage at 120° C.

2. A biaxially oriented polypropylene film that is 98–99.5% in isotacticity, above 99% in isotactic pentad fraction, and 1.5–3.5% in the sum of the machine- and transverse-direction heat shrinkage at 120° C.

3. A biaxially oriented polypropylene film as described in claim 1 that is less than 30 ppm in ash content, less than 10 ppm·% in the product of the film's ash content and internal haze (%), and 72–78% in the film's crystallinity.

4. A biaxially oriented polypropylene film that has properties as shown by the following formula and is above 99% in isotactic pentad fraction:

$$\text{Ash} \cdot H \leq 10 (\text{ppm} \cdot \%)$$

where Ash and H denote the film's ash content and the internal haze, respectively.

5. A biaxially oriented polypropylene film as described in claim 4 that is 98.5–99.5% in isotacticity, and 1–4% in the sum of the machine- and transverse-direction heat shrinkage at 120° C.

6. A biaxially oriented polypropylene film as described in claim 1 that is 0.5–40 μm in film thickness, d, and larger than $580-(200/d^{0.5})$ (V/μm) in DC dielectric strength per unit thickness at 105° C.

7. A biaxially oriented polypropylene film as described in claim 1 that contains at least one phenolic antioxidant having a molecular weight of 500 or more, with the antioxidant content being 0.03–1 wt. %.

8. A capacitor wherein a biaxially oriented polypropylene film as described in claim 1 is used as dielectric.

9. A metallized film capacitor as described in claim 8 wherein a biaxially oriented polypropylene film is metallized and wound.

10. A capacitor as described in claim 8 wherein the biaxially oriented polypropylene film used as dielectric is 200 V/μm or more in AC dielectric strength per unit thickness at 105° C.

11. A capacitor as described in claim 8 wherein the biaxially oriented polypropylene film used as dielectric is 500 hours or more in operating life at 105° C. under an AC voltage per unit thickness of 60 V/μm.

12. A capacitor as described in claim 8 wherein the biaxially oriented polypropylene film used as dielectric is 1000 hours or more in operating life at 105° C. under an AC voltage per unit thickness of 60 V/μm.

* * * * *